US008282071B2

(12) United States Patent
Tabelander et al.

(10) Patent No.: US 8,282,071 B2
(45) Date of Patent: Oct. 9, 2012

(54) METHOD AND DEVICE FOR THE ACTIVATION OF AN ELECTROPNEUMATIC VALVE OF A PRESSURE MEDIUM-ACTUATED POSITION CONTROLLER

(75) Inventors: Stefan Tabelander, Herford (DE); Andreas Wahlmann, Meerbeck (DE)

(73) Assignee: ABB Technology AG, Zurich (CH)

( * ) Notice: Subject to any disclaimer, the term of this patent is extended or adjusted under 35 U.S.C. 154(b) by 664 days.

(21) Appl. No.: 12/539,964

(22) Filed: Aug. 12, 2009

(65) Prior Publication Data

US 2010/0037957 A1 Feb. 18, 2010

(30) Foreign Application Priority Data

Aug. 12, 2008 (DE) ......................... 10 2008 038 723

(51) Int. Cl.
*F16K 31/02* (2006.01)

(52) U.S. Cl. .................................. 251/129.04; 700/282

(58) Field of Classification Search ............. 251/129.04; 137/14, 487.5; 700/282
See application file for complete search history.

(56) References Cited

U.S. PATENT DOCUMENTS 4,855,659 A * 8/1989 Riensche .................. 137/487.5
5,197,328 A * 3/1993 Fitzgerald .................. 137/487.5
5,431,182 A * 7/1995 Brown ....................... 137/487.5
5,538,036 A * 7/1996 Bergamini et al. ........... 137/552
5,558,115 A * 9/1996 Lenz et al. ................. 137/487.5
5,651,385 A * 7/1997 Karte ......................... 137/487.5
6,035,878 A * 3/2000 Adams et al. .............. 137/487.5
6,186,167 B1 * 2/2001 Grumstrup et al. ........ 137/487.5
6,202,680 B1 * 3/2001 Irokawa et al. .......... 251/129.04
6,862,547 B2 * 3/2005 Snowbarger et al. ........... 137/14
7,079,021 B2 * 7/2006 Snowbarger et al. ........... 137/14
7,556,238 B2 * 7/2009 Seberger .................. 251/129.04
7,862,003 B2 * 1/2011 Karte et al. .............. 251/129.04
2007/0045579 A1 3/2007 Wirtl et al.

FOREIGN PATENT DOCUMENTS

DE 24 35 354 C3 2/1976
DE 37 12 481 A1 10/1988
EP 0 822 344 A2 2/1998
EP 1 758 007 A1 2/2007

OTHER PUBLICATIONS

*German Search Report dated Mar. 5, 2009.

* cited by examiner

*Primary Examiner* — Eric Keasel
(74) *Attorney, Agent, or Firm* — Buchanan Ingersoll & Rooney PC

(57) ABSTRACT

A device for activating an electropneumatic valve of a pressure medium-operated position controller, in which the valve is activated by a manipulated variable. To achieve a blocking fail-safe behavior in case of a failure of a pressure medium, the device includes means for detecting the current position of a booster stage downstream of the valve and assigning the manipulated variable based on the detected position, and means for measuring a first variable to be influenced by the position controller. The device includes an evaluation unit configured to determine an expected directional reaction of the first variable to the assigned manipulated variable, compare the expected reaction with the measured reaction, determine a pressure medium failure as a fault situation if the expected reaction does not coincide with the measured reaction, and assign, as a new manipulated variable for the valve, an emergency signal generating a blocking fail-safe behavior of the valve.

14 Claims, 1 Drawing Sheet

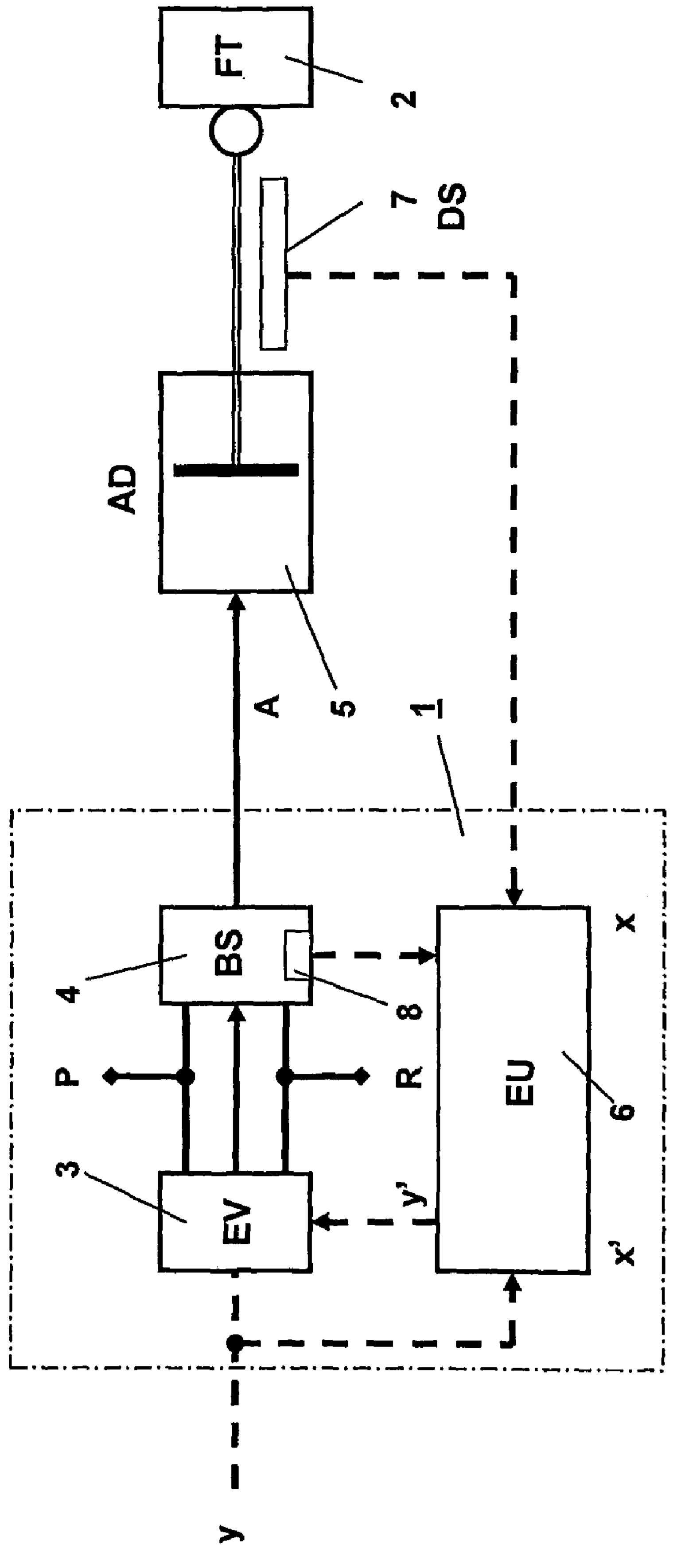
FT
2
7
DS
AD
A
5
1
BS
4
8
P
R
EU
6
3
EV
y'
x'
x
y

METHOD AND DEVICE FOR THE ACTIVATION OF AN ELECTROPNEUMATIC VALVE OF A PRESSURE MEDIUM-ACTUATED POSITION CONTROLLER

RELATED APPLICATION

This application claims priority under 35 U.S.C. §119 to German Patent Application No. 10 2008 038 723.1 filed in Germany on Dec. 8, 2008, the entire content of which is hereby incorporated by reference in its entirety.

FIELD

The present disclosure relates to a method and a device for the activation of an electropneumatic valve of a pressure medium-actuable position controller. According to an exemplary embodiment, the electropneumatic valve can be activated by an electrical signal as a manipulated variable within a process regulation and control loop, so as to act with an actuating pressure upon a downstream booster stage of the position controller. The present disclosure also relates to a position controller for working appliances, comprising the abovementioned device.

BACKGROUND INFORMATION

Exemplary embodiments of the present disclosure encompass, for example, the activation of electropneumatic valves which can be used as actuating valves for the control or position regulation of actuating or regulating drives. Valves of this type can be designed as 3/3-way valves in order to make it possible to, in addition to providing an aerating and venting function, have a closed-off middle position for deviation control according to stipulated desired values, so that, in emergency situations, for example, the current actuating pressure can be kept constant, and the connected actuating drive can thereby remain in its current position. For acting with a pressure medium upon the actuating drive, a booster stage can be provided downstream of the 3/3-way valve and be acted upon by the pilot control pressure. Such a booster stage can be designed, with the effect of an intensifying function, to generate a higher actuating force for a correspondingly higher actuating pressure. Within this scope of such an exemplary field of use, exemplary embodiments of the present disclosure are directed to the behavior of the position controller in the event of a failure of the feed pressure supply, which can provide compressed air, for example, as the pressure medium.

It is known that, in the event of the failure of the feed pressure supply, the valve mechanism comes into an initial position which ensures a venting of the connected pneumatic actuating drive. Venting has the effect that the connected actuating drive is moved into a defined end position via an integrated spring, thus, in turn, completely opening or closing the fitting connected to it. Such a fitting may in this case be, for example, a flat slide valve inserted into a pipeline of a chemical engineering plant.

However, special applications require that the fitting connected to the actuating drive maintain its current position when the feed pressure supply to the position controller or the electrical actuating signal fails. This requirement has hitherto been a substantial reason for the use of electrical position controllers instead of the pressure medium-operated position controllers relevant to the present disclosure.

A generic pressure medium-operated position controller is disclosed in US 2007/0045579 A1. This position controller has an actuating device, by means of which a feed pressure connection, a venting connection and a working connection for generating an actuating pressure of an actuating drive can be switched variably. To stipulate the desired switching position, the actuating device has two fluid action surfaces which are oriented opposite to one another and which each delimit a control chamber. Both control chambers are connected to a common control pressure connection, with a throttle device being interposed. Downstream of the two throttle devices, each control chamber is connected to a venting port. A control valve device can control the two venting ports and also close them simultaneously.

This symmetrical set-up with respect to the two fluid action surfaces, along with activation via one commonly assigned control pressure connection, ensures that the fluidic actuating forces acting on the control device when the two venting ports are closed simultaneously compensatory to one another, and a clearly defined position of the actuating device is obtained. There is the possibility, with the venting ports closed, of stipulating a basic position of the actuating device in which the working connection is separated both from the feed connection and from the venting connection. That is, the middle switching position of a 3/3-way valve can be achieved, so that a constant pilot control pressure is maintained, to thereby give the position controller a blocking fail-safe behavior.

The electrical activation of the position controller may take place in a flexible way so that it is possible to control the downstream booster stage such that (1) the pressure medium can be conducted in a directed manner from the feed pressure connection via the working connection into the pneumatic actuating drive, or (2) the pressure medium can be conducted in a directed manner out of the pneumatic actuating drive via the venting connection into the atmosphere, or (3) the pressure medium can be enclosed in the booster stage to maintain the current position of the actuating drive.

In this known technique, however, the fail-safe behavior as a result of the failure of pressure medium (e.g., due to the breakaway of the pneumatic feed pressure line from the feed pressure connection) is a disadvantage. This is because, depending on the electrical activation prevailing at this timepoint, the electropneumatic valve functioning as a pilot control valve will fail either when venting or when blocking. The choice in this case is, as far as possible, left to chance. Venting failure means that the pressure medium is discharged out of the actuating drive into the surroundings. Blocking failure means that the pressure medium contained in the booster stage, i.e., in the actuating drive, is enclosed.

The reason for this weakness in the system is that the feed pressure medium supplied to the control valve device is extracted from the feed pressure duct of the position controller. When the position controller assumes the aerating position for the connected actuating drive, the assigned valve chamber opens and thus connects the feed pressure connection to the feed pressure chamber for acting upon the actuating drive.

Then, if the feed pressure line is separated, with electrical activation unchanged, the actuating drive is capable, via the spring return position integrated in it, of venting and/or ventilating the compressed air contained therein via the open feed pressure connection. However, since the control valve device continues to remain regulatable with the aid of the outflowing compressed air, the control pressure is still maintained, and therefore the open position of the position controller can continue to be maintained. The actuating drive is therefore vented until the control pressure controller no longer delivers sufficient control pressure, at which time the position controller is finally closed. The position drive is then vented completely and is in the pressureless initial position.

If, by contrast, the control valve device is activated such that a venting or blocking of the actuating drive is brought about, the pressure medium is enclosed in the actuating drive, even with the feed pressure connection separated, and therefore the actuating drive is blocked.

SUMMARY

An exemplary embodiment provides a method of activating an electropneumatic valve of a pressure medium-operated position controller to achieve a blocking fail-safe behavior in the event of a failure of a pressure medium, in which the electropneumatic valve is activated by an electrical signal as a manipulated variable within a process regulation and control loop, so as to act with a pilot control pressure upon a booster stage of a position controller downstream of the electropneumatic valve. The exemplary method comprises detecting a current position of the booster stage after action with the pilot control pressure and assignment of a manipulated variable corresponding to the detected current position. The exemplary method also comprises continuously measuring at least one of a regulation variable and a process variable to be influenced by the position controller, and determining an expected directional reaction of the at least one of the regulation variable and process variable to the assigned manipulated variable. In addition, the exemplary method comprises comparing the determined expected directional reaction with the measured actual directional reaction of the at least one of the regulation variable and process variable, and determining existence of a pressure medium failure, upon detecting that the expected directional reaction does not coincide with the actual directional reaction. Furthermore, exemplary method comprises assigning an electrical emergency signal generating the blocking fail-safe behavior of the electropneumatic valve as a new manipulated variable.

An exemplary embodiment provides a device for the activation of an electropneumatic valve of a pressure medium-operated position controller, in which the electropneumatic valve is configured to be activated by an electrical signal constituting a manipulated variable within a process regulation and control loop, to act with a pilot control pressure upon a booster stage downstream of the electropneumatic valve to actuate an acutating drive. The exemplary device is configured to achieve a blocking fail-safe behavior as a result of the failure of a pressure medium. The exemplary device comprises detecting means for detecting a current position of the booster stage after action with the pilot control pressure and assigning the manipulated variable to correspond to the detected current position, and sensor means for continuously measuring at least one of a regulation variable and a process variable to be influenced by the position controller. In addition, the exemplary device comprises evaluation means for determining an expected directional reaction of the at least one of the regulation variable and process variable to the assigned manipulated variable, and to compare the expected directional reaction with the measured actual directional reaction of the at least one of the regulation variable and process variable. The exemplary device also comprises determining means for determining the existence of a pressure medium failure upon the evaluation means determining that the expected directional reaction does not coincide with the actual directional reaction. Furthermore, the exemplary device comprises assigning means for assigning an electrical emergency signal generating a blocking fail-safe behavior of the electropneumatic valve as a new manipulated variable for the electropneumatic valve.

Another exemplary embodiment of the present disclosure provides a device configured to activate an electropneumatic valve of a pressure medium-operated position controller, in which the electropneumatic valve is configured to be activated by an electrical signal constituting a manipulated variable within a process regulation and control loop, to act with a pilot control pressure upon a booster stage downstream of the electropneumatic valve to actuate an acutating drive. The exemplary device is configured to achieve a blocking fail-safe behavior as a result of the failure of a pressure medium. The exemplary device comprises a detector configured to detect a current position of the booster stage after action with the pilot control pressure and assign the manipulated variable to correspond to the detected current position. In addition, the exemplary device comprises a sensor configured to continuously measure at least one of a regulation variable and a process variable to be influenced by the position controller. Furthermore, the exemplary device comprises an evaluation unit configured to determine an expected directional reaction of the at least one of the regulation variable and process variable to the assigned manipulated variable, to compare the expected directional reaction with the measured actual directional reaction of the at least one of the regulation variable and process variable, to determine existence of a pressure medium failure upon the evaluation unit determining that the expected directional reaction does not coincide with the actual directional reaction, and to assign an electrical emergency signal generating a blocking fail-safe behavior of the electropneumatic valve as a new manipulated variable for the electropneumatic valve.

BRIEF DESCRIPTION OF THE DRAWING

Additional features, advantages and refinements of the present disclosure are described below in greater detail with reference to an exemplary embodiment illustrated in the drawing, in which:

FIG. 1 shows a diagrammatic illustration of an exemplary pressure medium-operated position controller for fittings, according to at least one embodiment.

DETAILED DESCRIPTION

Exemplary embodiments of the present disclosure provide a method and a device for the activation of a pressure medium-operated position controller, in which a defined blocking fail-safe behavior as a result of the failure of a pressure medium is ensured.

An exemplary embodiment of the present disclosure provides a method of achieving a blocking fail-safe behavior as a result of the failure of a pressure medium. The exemplary method can include the following steps:

- detecting the current position of the booster stage after action with the pilot control pressure and assignment of a manipulated variable (y) corresponding to the detected position,
- continuously measuring at least one regulation or process variable to be influenced by the position controller,
- determining an expected directional reaction (x') of the regulation or process variable to the stipulated (assigned) manipulated variable (y),
- comparing the expected directional reaction (x') with the measured actual directional reaction (x) of the regulation or process variable, determining a pressure media failure, upon detecting that the expected directional reaction (x') does not coincide with the actual directional reaction (x), to deduce a pressure medium failure, and assigning an electrical emergency signal constituting the blocking fail-safe behavior of an electropneumatic valve (e.g., an electropneumatic 3/3 way valve) as a new manipulated variable (y').

An advantageous aspect of the above-described exemplary method is that, independent of the switching position of the pressure medium-operated position controller, the desired blocking fail-safe behavior can be ensured, in the event of a failure of pneumatic energy, by means of an active activation of the pneumatic pilot control. Moreover, this ensures that the electropneumatic valve of the pilot control cannot continue to be fed with outflowing pressure medium from the actuating drive. This adaptive control forms the basis for sending a diagnostic message corresponding to the fault situation to a central control unit (e.g., CPU). When a potential pneumatic energy failure is detected, the new activation signal required for the desired blocking may only need to be applied for a short time. Thereafter, the actuating signal stipulated by the process regulation and control loop can be transmitted, unchanged, to the electropneumatic valve, with the effect that, in the event of a possible faulty detection of a pneumatic energy failure, regulation can continue to operate, unaffected. It is also conceived that if a pneumatic energy failure is detected, the activation signal required for the desired blocking can be applied, perhaps permanently, and further normal operation solely by interaction between an overriding control and an operator can be achieved. This is practical especially when a corresponding diagnostic message has previously been transmitted to the overriding control, whereupon the operator has to react in order to rectify the fault.

According to an exemplary embodiment, by means of the electrical emergency signal, the pressure medium acting upon the booster stage can be enclosed via a neutral position of the electropneumatic valve, so as to achieve a leaktight closure. Moreover, an electrical activation signal can be transmitted to the electropneumatic valve, which can cause the pressure medium acting upon the booster stage to be discharged to the atmosphere via the exhaust air duct of the electropneumatic valve. A reversal of activation opposite to the original direction is thereby achieved, so that the position controller can assume its initial position.

According to an exemplary embodiment, an evaluation unit is provided, as an electronic circuit, for example, to determine an expected directional reaction of the regulation or process variable to the stipulated manipulated variable, and compare the expected directional reaction with the actual directional reaction. In signal processing terms, the expected directional reaction can, for example, be formed by means of the mathematical relation of the first derivative of the expected speed signal dx'/dt, and the comparison with the measured speed signal dx/dt is carried out. If the measured speed signal dx/dt and the expected speed signal dx'/dt possess the same direction due to the same signs, a pressure medium failure can be established as a fault situation when the expected direction does not correspond to the measured direction of the actuating drive, i.e., the signs are different.

According to an exemplary embodiment, in regards to signal processing in the evaluation unit, a tolerance band corresponding to the system-induced quantization noise is applied in the measured speed signal dx/dt to prevent an unwanted detection of a pressure medium failure.

With regard to a device corresponding to the exemplary method described above, and any modifications and/or refinements as described hereinafter, the means used for the detection of the current position of the booster stage can be, for example, a contactlessly operating position sensor which is arranged at a suitable location on the housing of the position controller. A suitable location is where the position sensor can reliably monitor the stroke movement of the movable parts within the booster stage. A capacitive or inductive position sensor, for example, may in this case be considered as a contactless position sensor. In the latter case, a permanent magnet can be integrated in the movable valve parts, to generate the inductive measurement effect in the inductive position sensor.

The sensor means for the continuous measurement of at least one regulation or process variable to be influenced by the position controller may likewise be designed as a position sensor which detects the position of the actuating drive. For example, the sensor means can be embodied by a displacement transducer designed in the manner of a slide resistor. In addition, inductive or capacitive displacement or position sensors may also be used, which are integrated at a fixed location in the region of the actuating drive. The regulation or process variable (x) can thereby be determined as a feedback variable of the actuating drive.

FIG. 1 illustrates an exemplary embodiment of a pressure medium-operated position controller 1 that is configured to activate a fitting (FT) 2 arranged downstream from the position controller 1. In the example of FIG. 1, the fitting 2 is illustrated as a flat slide valve of a pipeline system, such as in a chemical engineering plant, for example. The present disclosure is not limited to this example of the fitting 2, and any type of fitting may be accommodated downstream of the position controller 1.

The position controller 1 includes an electropneumatic valve (EV) 3 which can be configured to function as a pilot control valve, and a booster stage (BS) 4 with a pilot control pressure for actuating an internal valve mechanism. According to an exemplary embodiment, the electropneumatic valve can be a 3/3 way valve, for example, and be arranged downstream of the electropneumatic valve 3, as illustrated in the example of FIG. 1. The booster stage 4 can deliver the working pressure for the actuation of an actuating drive (AD) 5, to operate the fitting 2. In the example of FIG. 1, the actuating drive 5 is illustrated as a piston/cylinder configuration, although the present disclosure is not limited thereto. To activate the electropneumatic 3/3-way valve 3 of the pressure medium-operated flow controller 1, an electrical signal can serve as a manipulated variable y within a process regulation and control loop.

According to an exemplary embodiment, if the feed pressure line breaks away from a feed pressure connection P of the position controller 1, the position controller 1 exhibits a reliably blocking fail-safe behavior which is achieved as follows.

According to an exemplary embodiment, an electronic evaluation unit (EU) 6 can be supplied on the input side, via a sensor (e.g., sensor means) for the continuous measurement of the position of the actuating drive 5. According to an exemplary embodiment, the evaluation unit 6 can be configured as a displacement sensor (DS) 7, for example, with a measured value which represents a regulation and/or process variable to be influenced. Furthermore, a contactlessly operating inductive position sensor (PS) 8 can be integrated in the booster stage 4, for example, to detect the current position of the valve mechanism within the booster stage 4. The booster stage 4 can supply the detected current position to the input side of the electronic evaluation unit 6. Moreover, the electronic evaluation unit 6 is also supplied on the input side with the electrical signal of the manipulated variable y. The evaluation unit 6 can determine from the manipulated variable y an expected directional reaction x' of the actuating drive 5 to the current stipulated manipulated variable y. If this expected directional reaction x' does not coincide with the actual directional reaction x, it is determined by the electronic evaluation unit 6 that there is a pressure medium failure which may be attributable, for example, to a breakaway of the pressure medium line from the feed pressure connection P and which constitutes a fault situation.

The electronic evaluation unit 6 can thereupon generate an electrical emergency signal as an equivalent manipulated variable y' for the electropneumatic valve 3, in order to block the electropneumatic valve 3, i.e., transfer it into the middle switching position in which all the connections P, R and A are closed off. Consequently, the pressure medium located within the downstream actuating drive 5 is shut in there, so that, the fitting 2 is caused to remain in its current position (i.e., is not activated by the activating drive S).

The present disclosure is not restricted to the exemplary embodiments described above. Rather, modifications and equivalents thereof encompassed within the spirit and environment of the present disclosure are to be embraced and covered by the scope of protection of the following claims. An advantageous feature of the present disclosure is that the booster stage is transferred as quickly as possible into the locked-off switching position, so that the pilot control pressure can no longer continue to be fed from the pressure medium flowing out from the actuating drive. For this purpose, it is advantageous to stipulate an electrical signal for the electropneumatic valve of the pilot control. In addition to leaktight closure by the transfer of the booster stage 4 into the middle closed-off switching position, it is also conceivable to cause a valve to move in the opposite direction. As a result, the switching mechanism of the booster stage 4 likewise can run through a shut-off point and thus achieves the advantageous effects of the present disclosure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Position controller
2 Fitting (FT)
3 Electropneumatic valve (EV)
4 Booster stage (BS)
5 Actuating drive (AD)
6 Evaluation unit (EU)
7 Displacement sensor (DS)
8 Position sensor
x Actual directional reaction
x' Expected directional reaction
y Manipulated variable
y' Equivalent manipulated variable

What is claimed is:

1. A method of activating an electropneumatic valve of a pressure medium-operated position controller to achieve a blocking fail-safe behavior in the event of a failure of a pressure medium, the electropneumatic valve being activated by an electrical signal as a manipulated variable within a process regulation and control loop, so as to act with a pilot control pressure upon a booster stage of a position controller downstream of the electropneumatic valve, the method comprising:

detecting a current position of the booster stage after action with the pilot control pressure and assignment of a manipulated variable corresponding to the detected current position;

continuously measuring at least one of a regulation variable and a process variable to be influenced by the position controller;

determining an expected directional reaction of the at least one of the regulation variable and process variable to the assigned manipulated variable;

comparing the determined expected directional reaction with the measured actual directional reaction of the at least one of the regulation variable and process variable;

determining existence of a pressure medium failure, upon detecting that the expected directional reaction does not coincide with the actual directional reaction; and assigning an electrical emergency signal generating the blocking fail-safe behavior of the electropneumatic valve as a new manipulated variable.

2. The method as claimed in claim 1, comprising discharging, via an electrical activation signal, the pressure medium acting upon the booster stage to a surrounding atmosphere via an exhaust air duct of the electropneumatic valve, to achieve a reversal of activation opposite to an original direction of the activation.

3. The method as claimed in claim 1, comprising enclosing, via the electrical emergency signal, the pressure medium acting upon the booster stage via a neutral position of the electropneumatic valve, to achieve a leaktight closure.

4. The method as claimed in claim 1, wherein the expected directional reaction is constituted by a mathematical relationship of a first derivative of an expected speed signal, wherein the comparing comprises comparing the expected directional reaction with a measured speed signal.

5. The method as claimed in claim 4, wherein the measured speed signal and the expected speed signal possess the same direction, and wherein the method comprises establishing a pressure medium failure as a fault situation when the expected directional reaction does not correspond to a measured direction of the actuating drive.

6. The method as claimed in claim 5, comprising applying, in the measured speed signal, a tolerance band corresponding to a system-induced induced quantization noise, to prevent an unwanted detection of a pressure medium failure.

7. The method of claim 1, wherein the electropneumatic valve is an electropneumatic 3/3-way valve.

8. A device for the activation of an electropneumatic valve of a pressure medium-operated position controller, the electropneumatic valve being configured to be activated by an electrical signal constituting a manipulated variable within a process regulation and control loop, to act with a pilot control pressure upon a booster stage downstream of the electropneumatic valve to actuate an acutating drive, the device being configured to achieve a blocking fail-safe behavior as a result of the failure of a pressure medium, the device comprising:

detecting means for detecting a current position of the booster stage after action with the pilot control pressure and assigning the manipulated variable to correspond to the detected current position;

sensor means for continuously measuring at least one of a regulation variable and a process variable to be influenced by the position controller;

evaluation means for determining an expected directional reaction of the at least one of the regulation variable and process variable to the assigned manipulated variable, and to compare the expected directional reaction with the measured actual directional reaction of the at least one of the regulation variable and process variable;

determining means for determining existence of a pressure medium failure upon the evaluation means determining that the expected directional reaction does not coincide with the actual directional reaction; and assigning means for assigning an electrical emergency signal generating a blocking fail-safe behavior of the electropneumatic valve as a new manipulated variable for the electropneumatic valve.

9. The device as claimed in claim 8, wherein the detecting means for detecting the current position of the booster stage comprises a contactlessly operating inductive or capacitive position sensor.

10. The device as claimed in claim 8, wherein the sensor means for continuously measuring the at least one of the regulation variable and process variable to be influenced by the position controller comprises a displacement sensor configured to detect a position of the actuating drive.

11. A pressure medium-operated position controller for a fitting, comprising an electropneumatic 3/3-way valve configured to actuate a booster stage downstream of the electropneumatic 3/3-way valve via a pilot control pressure, and a device as claimed in claim 10, to achieve a blocking fail-safe behavior as a result of the failure of a pressure medium.

12. A pressure medium-operated position controller for a fitting, comprising an electropneumatic 3/3-way valve configured to actuate a booster stage downstream of the electropneumatic 3/3-way valve via a pilot control pressure, and a device as claimed in claim 8, to achieve a blocking fail-safe behavior as a result of the failure of a pressure medium.

13. The device as claimed in claim 8, wherein the electropneumatic valve is an electropneumatic 3/3-way valve.

14. A device configured to activate an electropneumatic valve of a pressure medium-operated position controller, the electropneumatic valve being configured to be activated by an electrical signal constituting a manipulated variable within a process regulation and control loop, to act with a pilot control pressure upon a booster stage downstream of the electropneumatic valve to actuate an acutating drive, the device being configured to achieve a blocking fail-safe behavior as a result of the failure of a pressure medium, the device comprising:

a detector configured to detect a current position of the booster stage after action with the pilot control pressure and assign the manipulated variable to correspond to the detected current position;

a sensor configured to continuously measure at least one of a regulation variable and a process variable to be influenced by the position controller; and an evaluation unit configured to determine an expected directional reaction of the at least one of the regulation variable and process variable to the assigned manipulated variable, to compare the expected directional reaction with the measured actual directional reaction of the at least one of the regulation variable and process variable, to determine existence of a pressure medium failure upon the evaluation unit determining that the expected directional reaction does not coincide with the actual directional reaction, and to assign an electrical emergency signal generating a blocking fail-safe behavior of the electropneumatic valve as a new manipulated variable for the electropneumatic valve.

* * * * *